May 29, 1934.  F. E. KAHN  1,960,492
KITCHEN UTENSIL
Filed Sept. 19, 1932
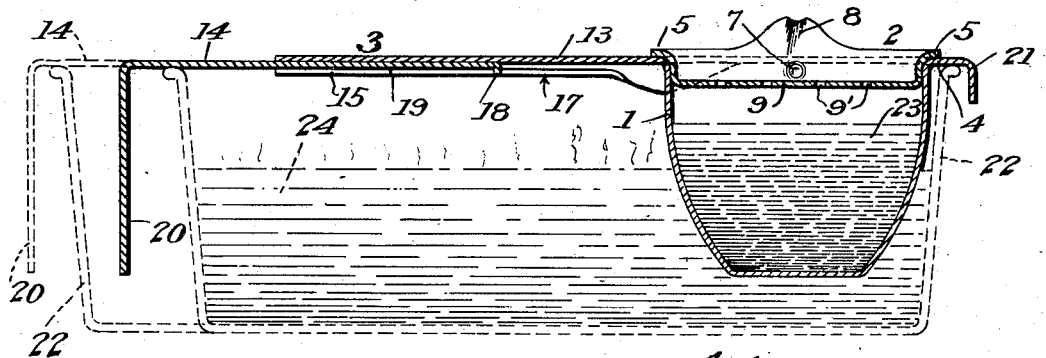
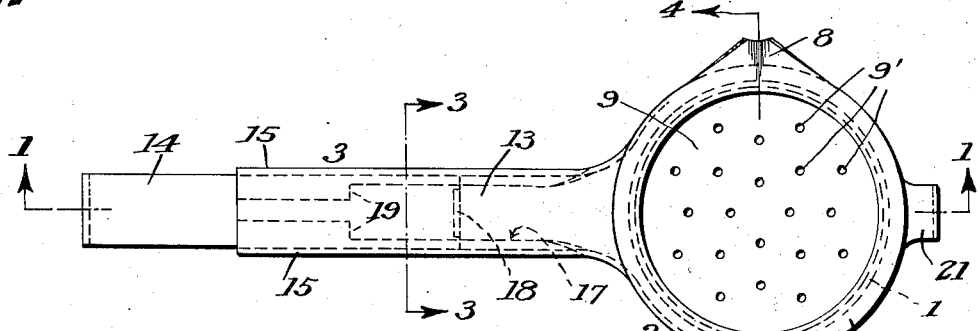
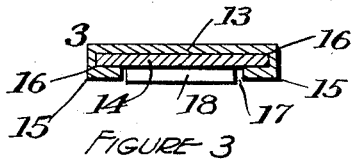
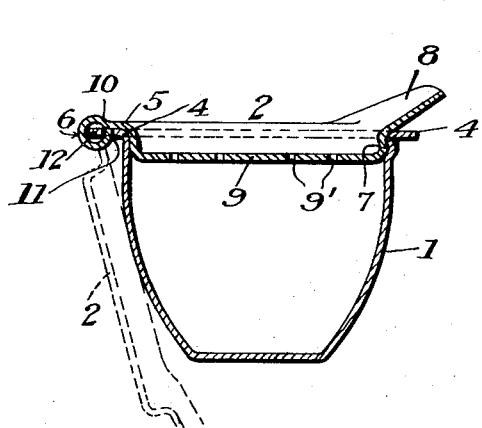
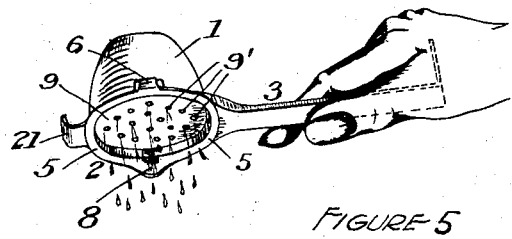
FRANCES E. KAHN
INVENTOR.
BY Alan Franklin
ATTORNEYS.

Patented May 29, 1934

1,960,492

UNITED STATES PATENT OFFICE 1,960,492

KITCHEN UTENSIL

Frances E. Kahn, Los Angeles, Calif.

Application September 19, 1932, Serial No. 633,728

3 Claims. (Cl. 65—12)

My invention relates to kitchen utensils, and more particularly to a utensil for heating food products, such as butter, to liquid form, and sprinkling its liquid food contents on foods, such as hot cakes, to be eaten.

The general object of my invention is to provide a kitchen utensil of the character stated which may be readily mounted in a saucepan containing hot water and its food contents heated to liquid form, and then removed from the saucepan and shaken to sprinkle its contents on foods to be eaten.

Another object is to provide a kitchen utensil of the character stated which may be adjusted to fit saucepans of different sizes.

Other objects and advantages will appear hereinafter.

My invention is illustrated in the annexed drawing which forms a part of this specification and in which, Fig. 1 is a vertical longitudinal section of my utensil taken on line 1—1 of Fig. 2, showing it mounted in a saucepan containing hot water for steam-heating its contents to liquid form.

Fig. 2 is a top plan view of my utensil.

Fig. 3 is a cross section of the adjustable handle of my utensil taken on line 3—3 of Fig. 2.

Fig. 4 is a cross section of the bowl of my utensil taken on line 4—4 of Fig. 2.

Fig. 5 is a perspective of my utensil, shown held inverted in the hand of the user, and in the act of being shaken and sprinkling its contents.

Corresponding parts are designated by the same reference characters in all the figures of the drawing.

My utensil comprises a bowl 1, a lid 2 for said bowl and a handle 3 for said bowl. The bowl 1 is formed at its mouth with an annular external flange 4. The lid 2 is in the form of a tray and fits in the mouth of the bowl, there being an annular external flange 5 formed on the outer edge of the lid to rest upon the bowl flange 4, whereby the lid is properly positioned in the mouth of the bowl. The lid 2 is hinged at one side to one side of the bowl 1 by a hinge 6 and is held in closed position over the mouth of the bowl by a snap catch 7 indented in the bowl and the lid. A spout 8 is formed in the side of the lid opposite the hinge 6. The closing wall 9 of the lid is provided with a plurality of small perforations 9' which may be arranged in any suitable order, through which perforations the contents of the bowl 1 may be shaken out of the bowl. The lid hinge 6 may be formed by an extension 10 from the edge of the lid flange 5, which extension is bent in a loop through a slot 11 in an extension 12 from the bowl flange 4.

The handle 3 may be formed in two telescopic sections 13 and 14, the section 13 being integral with and extending from the bowl flange 4 and the section 14 telescoping within the section 13 for adjustment of the length of the handle to rest upon saucepans of different sizes. The side edge portions 15 of the section 13 are bent to form longitudinal grooves 16 in which the section 14 slides, leaving an opening 17 between said edge portions on the under side of the section 13 the greater portion of its length through which may slide a depending abutment flange 18 on the inner end of the section 14, there being shoulders 19 formed at the outer end of said opening 17 to be engaged by said abutment flange 18 to limit the extension of the handle 2. The section 14 is bent downwardly at its outer end, forming a support 20, the lower end of which being aligned with the bottom of the bowl 1 so as to rest upon the surface upon which the bottom of the bowl may rest, so as to prevent the weight of the handle 2 from causing the handle to swing down and tip the bowl, thus enabling the bowl to rest in an upright position when set down on a table or other support. A lip 21 extends outwardly and downwardly from the bowl flange 4 diametrically opposite the handle 2 for resting upon the upper edge of a saucepan 22 for supporting the utensil in the sauce pan as will be hereinafter more fully described.

The operation, uses, and advantages of my invention are as follows:

The lid 2 is first swung into open position, as illustrated in dotted lines in Fig. 4, and the food product, such as butter 23 is placed in the bowl, but not in such an amount as to fill the bowl completely. The lid is then swung back into closed position over the mouth of the bowl 1, the lid fitting closely in the mouth of the bowl and held in closed position therein by the catch 7. The handle section 14 is then properly adjusted longitudinally in the section 13 to fit a saucepan 22 of a given size. My utensil is then placed in the saucepan containing hot water, as indicated at 24, the lip 21 and the handle section 14 resting upon the upper edge of the saucepan at diametrically opposite points and supporting the utensil properly in the saucepan. The steam from the hot water in the saucean heats the bowl and the butter therein until the butter is liquefied. The handle 2 is then grasped by one's hand and the utensil is removed from the saucepan, inverted and shaken by the hand, whereby the liquid butter is sprinkled from the bowl through the lid perforations 9' onto food to be eaten, such as hot cakes, as illustrated in Fig. 5. When the bowl is inverted the liquid food product does not run out of the bowl through the perforations 9' owing to their small size, thus making it necessary to shake the bowl to sprinkle the food product from the bowl through the perforations 9'. The liquid food product however, may be poured out of the bowl through the perforations 9' into the outer receptacle portion of the lid and out through the spout 8, when the bowl is tipped at such an angle as to admit air through the uppermost perforations 9' into the bowl 1 above the liquid food product.

By adjusting the handle section 14 longitudinally in the handle section 13, the handle 2 may be lengthened or shortened to rest upon the upper edge of saucepans of different sizes, thus adjusting the utensil to saucepans of different sizes.

I claim as my invention:

1. A utensil as disclosed comprising a bowl, a handle for said bowl formed in two telescopic sections, one of said sections extending from said bowl, and a lip extending from said bowl for resting upon the edge of a saucepan with the outer section of said handle resting upon the opposite edge of the saucepan for supporting said bowl within said saucepan, and means for limiting the telescoping of the sections of said handle.

2. An utensil as disclosed comprising a bowl, a lid for said bowl in the form of a tray and formed with a spout leading therefrom, said lid being hinged to said bowl, means for detachably holding said lid closed over the mouth of said bowl when inverted, said lid being provided with a plurality of minute openings to permit retarded, non-pouring passage of a thin liquid, such as melted butter, from said bowl, and a handle extending from said bowl at right angles to said spout.

3. An utensil as disclosed comprising a bowl, a lid for said bowl, in the form of a tray, telescopically fitted in the mouth of said bowl and formed with an external flange projecting from its upper edge over the edge of the mouth of said bowl, said flange being formed with a spout leading from the lid, the marginal engaging walls of said lid and said bowl being formed with interengaging, resilient securing means for securing said lid in position closing the mouth of said bowl, the bottom of the lid being provided with minute openings to permit retarded, non-pouring passage of a thin liquid, such as melted butter, from said bowl, and a handle for said bowl.

FRANCES E. KAHN.